July 15, 1941.  F. W. GOETZE  2,249,127
COMPOSITE GASKET AND CASING THEREFOR
Filed Oct. 16, 1939  2 Sheets-Sheet 1

INVENTOR:
FREDERICK W. GOETZE
BY Herman Eisele
ATTORNEY.

July 15, 1941.    F. W. GOETZE    2,249,127
COMPOSITE GASKET AND CASING THEREFOR
Filed Oct. 16, 1939    2 Sheets-Sheet 2
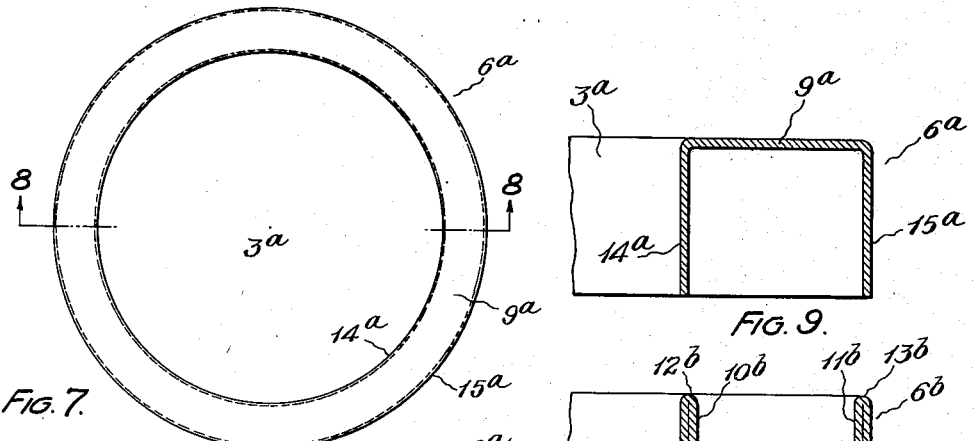
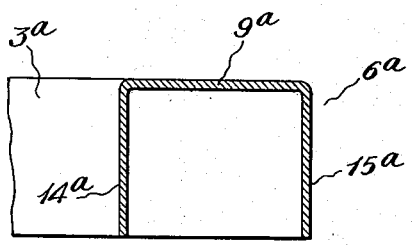
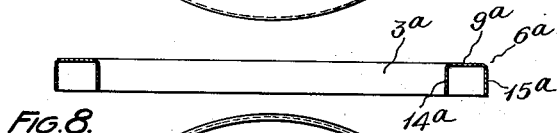
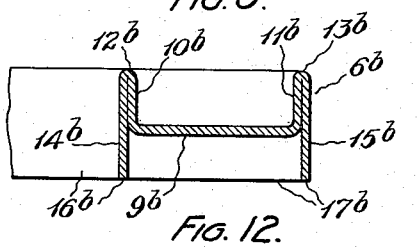
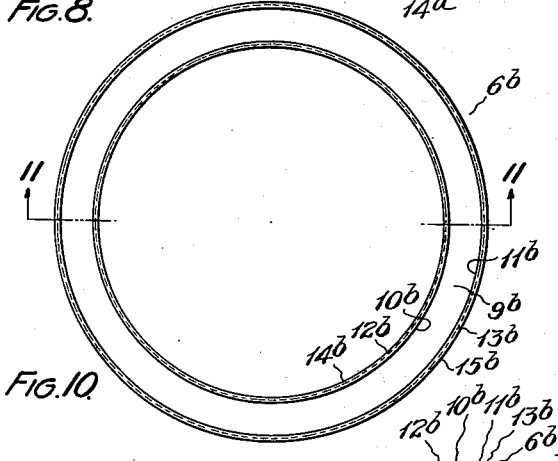
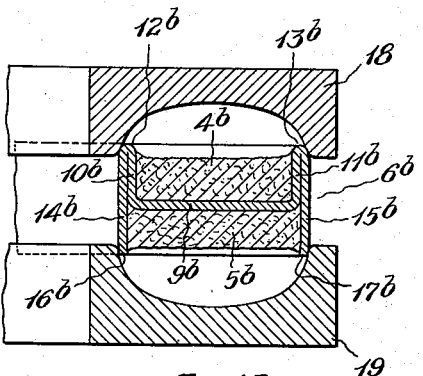
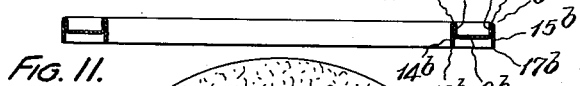
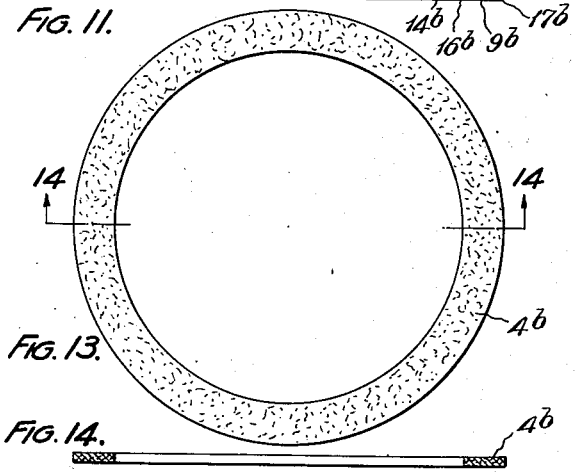
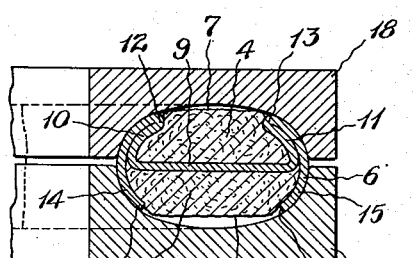
INVENTOR:
FREDERICK W. GOETZE
BY Herman Eisele
ATTORNEY.

Patented July 15, 1941

2,249,127

UNITED STATES PATENT OFFICE 2,249,127

COMPOSITE GASKET AND CASING THEREFOR

Frederick W. Goetze, Plainfield, N. J.

Application October 16, 1939, Serial No. 299,655

13 Claims. (Cl. 288—26)

This invention relates to gaskets adapted to seal joints between opposed surfaces and particularly to seal joints between surfaces which have been roughly machined, or which are otherwise uneven, distorted, corroded or pitted, or joints which are exposed to severe conditions.

Ordinarily a gasket cut from soft sheet packing material would be most suitable and most effective for sealing such irregular joint surfaces. Such soft gaskets, however, have certain clearly apparent disadvantages in handling, shipping and assembling and when severe conditions of temperature and/or pressure are encountered such gaskets are manifestly unsafe and dangerous, unless the soft packing material is satisfactorily reinforced or armored.

In order to satisfactorily meet these severe conditions, gaskets have been produced consisting of a relatively soft and preferably heat resisting packing material, such as asbestos, combined with sheet metal armoring or reinforcing, which gaskets may be designated as composite gaskets.

Gaskets coming under this general classification are extensively used in the commercial art and are plentiful in the patented art. Practically all of the commercial and patented gaskets of this classification, however, are of the type in which the compressible packing material is enclosed in, or covered by the sheet metal and in which the gasket enclosing sheet metal engages the opposed surfaces to be sealed. It has frequently been found extremely difficult to make joints tight with composite gaskets of this type particularly where the gasket engaging surfaces are rough, corroded or pitted, due to the difficulty, if not impossibility, of making a fluid tight sealing engagement between the relatively hard smooth surface of the sheet metal covering and the irregular surfaces to be sealed.

In a few composite gaskets, only one face of the packing material is covered by the sheet metal while the other face is exposed, in which instances one of the surfaces to be sealed contacts the packing while the other surface contacts the sheet metal. Gaskets of this type have generally been found even under severe conditions to readily form a tight seal between the packing face and the joint surface while a seal between the sheet metal face and the joint surface is not so readily effected; and in order to produce a tight seal with such a gasket when both joint surfaces are rough, a pressure must be applied to the gasket sufficiently heavy to form a seal, if possible, between the sheet metal face and the joint surface, which pressure is substantially in excess of the pressure required to produce a tight seal between the packing face and the joint surface. It is accordingly evident that such a composite gasket in which one face consists of soft packing material and the other of hard sheet metal is only half a solution for the problem.

It has therefore been recognized that a light and rigid composite sheet metal and asbestos gasket in which both joint engaging surfaces comprise asbestos faces would satisfy an urgent requirement; but it has heretofore been impossible to produce such a double asbestos faced gasket construction of suitable strength, rigidity, and lightness in which the asbestos faces would be satisfactorily supported.

It is accordingly a primary object of this invention to produce a composite sheet metal and packing gasket in which both of the joint surface engaging faces comprise packing sufficiently compressible and so disposed relatively to the sheet metal casing or shell of the gasket, to permit the face of the packing to imbed itself in the rough, corroded or pitted face of the opposed joint surfaces sufficiently to produce a tight seal.

It is a further object of this invention to produce a composite sheet metal and asbestos gasket which will make a tight seal joint without the necessity of applying excessive pressure to the joint surfaces and connecting means.

It is a further object of this invention to produce a gasket of this type which includes a light, inexpensive casing or shell formed of a single integral piece of sheet metal adapted to rigidly and permanently maintain the two compressible packing faces positioned in the shell, not only in service but also in handling, in shipping and in assembling.

It is a further object of this invention to produce a gasket comprising two separate packing elements spaced apart by a sheet metal wall and confined and positioned by flanges integrally formed from extensions of the sheet metal spacing wall.

It is a further object to produce a gasket of this type in which both packing elements on at least one periphery are protected, when in service, by an uninterrupted wall of the sheet metal shell against the abrading action of the enclosed fluid.

It is a further object of this invention to produce a gasket in which the packing confining flanges of the sheet metal shell are adapted to engage the joint surfaces and in which the flanges are sufficiently resilient to maintain intimate contact with the joint surfaces as the spacing of the surfaces may vary with the changes of temperature of the flanges, flange bolts or associated piping.

A further object of this invention is to produce a gasket of this type comprising a shell in which both the upper and lower peripheral flanges confining the edges of the respective packing elements are curved toward the packing material whereby an axial compression of the gasket will tend to produce an inward movement of the peripheral flanges of the shell toward the packing material, as a result of which a spreading or blowing of the packing material under excessive compression is prevented.

It is a further object of this invention to produce a composite sheet metal and asbestos gasket which will quite readily change its thickness but not perceptibly change its area as the pressure is applied.

It is a further object of this invention to produce an improved form of armoring shell or casing from relatively resilient thin sheet metal made of a single piece of sheet metal and formed on opposed sides with channels or recesses adapted to receive substantially identical sheets of packing material.

It is a further object of this invention to produce an improved form of gasket shell or casing having flanges at its inner and outer peripheries, the flanges being firmly held together by a sheet metal web integrally formed with the flanges and disposed intermediate the edges of the flanges.

It is a further object of this invention to produce an improved form of sheet metal gasket shell of the above type in which the flange walls are formed either in part or entirely of a double thickness of formed sheet metal.

It is a further object of this invention to produce an improved conformation of gasket shell formed from an integral plate in which a transverse section thru the wall structure from inner to outer periphery simulates an I-beam being formed with flanges and a web, producing a section of maximum strength to resist radial distortion.

Further and more specific objects of this invention will become apparent from the following description and claims.

Referring to the drawings:

Fig. 7 is a plan view of a partially completed stamping from which is produced the shell or casing for the improved gasket illustrated in Figures 1, 2, and 3, the stamping being shown in one of the initial and partially completed stages of fabrication.

Fig. 8 is a transverse sectional view of the stamping shown in Fig. 7 this view being taken upon the plane indicated by line 8, 8 in Fig. 7.

Fig. 9 is an enlarged sectional view of one side of the stamping shown in Fig. 7, this view being an enlargement of a portion of Fig. 8.

Fig. 10 is a plan view similar to Fig. 7, illustrating the stamping in a more advanced stage of fabrication in which this stamping has been further operated upon to produce twin channel grooves on opposed faces, these grooves being ready to receive the packing elements.

Fig. 11 is a transverse sectional view of the stamping shown in Fig. 10, this view being taken upon the plane indicated by line 11, 11 in Fig. 10.

Fig. 12 is an enlarged sectional view of one side of the advanced stamping shown in Fig. 10, this view also being an enlarged view of a portion of Fig. 11, illustrating in detail the contour of the casing or shell in the form in which it is ready to receive the packing elements.

Fig. 13 is a typical plan view of one of the two relatively soft packing elements used as the compressible elements in the gasket illustrated in Figures 1, 2, and 3.

Fig. 14 is a transverse sectional view thru the packing element, this view being taken on the plane indicated by line 14, 14 in Fig. 13.

Fig. 15 is an enlarged transverse sectional view thru the partly completed gasket in which the packing elements are assembled in the casing, this partly completed gasket being shown associated with fragmentary portions of the dies which perform the final operation, these dies being shown in partly closed position.

Fig. 16 is a view similar to Fig. 15 but illustrating the position of the parts when the dies have been advanced to the closed position and have completed the forming of the gasket by curving the side walls of the one piece shell toward the packing elements.

Figure 1:
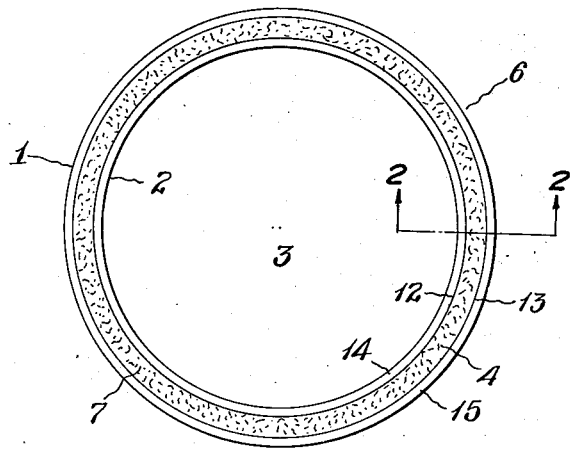
Fig. 1 is a plan view of one form of this improved composite gasket.

The form of this invention illustrated in Figures 1 to 3 will first be described. The type of composite gasket in which this invention is embodied in these figures is shown, for purposes of illustration in annular form, including an outer periphery 1 and an inner periphery 2 defining an opening 3.

This composite gasket consists of a pair of packing elements 4 and 5 disposed respectively on the upper and lower sides of the gasket, as viewed in the drawings. The packing elements are mounted in a sheet metal casing, shell or holder indicated generally at 6.

The packing elements are made of a relatively soft compressible and preferably heat resisting material, such for instance as asbestos or one of its compounds, and may be formed by cutting from sheet packing or made in any other convenient manner. These packing elements or layers 4 and 5 are formed with faces 7 and 8, respectively, adapted to engage the surfaces of the flanges or joints to be sealed.

The sheet metal casing or shell 6 is preferably formed of a single integral piece of thin relatively stiff sheet metal which is somewhat resilient, this casing being produced by stamping, drawing, spinning or otherwise, as will be hereinafter more fully explained.

The preferred metals recommended for use in this casing are such as sheet steel with or without a protective coating, hard drawn sheet copper, brass and the like, as distinguished from lead and other similar relatively soft, readily deformable and nonresilient metals.

The casing 6 consists, in the embodiment disclosed, of a relatively flat web portion indicated at 9, generally perpendicular to the axis of the opening, that is, parallel to the plane of the gasket and of substantially the same contour or outline as the adjacent faces of the packing elements which are seated against the web. At the inner periphery of the web 9, the sheet metal is bent generally laterally or outwardly from the plane of the web to form a flange 10 engaging the inner periphery of the packing element 4 and terminating at 12 adjacent to the outer face of this packing element. At the outer periphery of the web 9, the sheet metal is likewise bent laterally or outwardly from the plane of the web to form a flange 11 engaging the outer periphery of the packing element 4 and terminating at 13. In the embodiment illustrated, both of these flanges 10 and 11 are bent in the same direction from the plane of the web.

Figure 2:
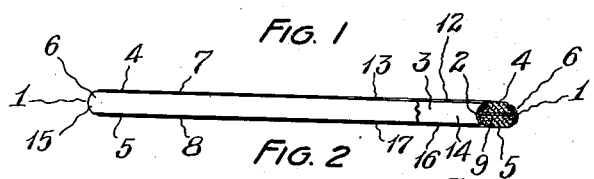
Fig. 2 is a side elevation of this improved composite gasket, this view being shown partly broken away on the plane indicated by line 2, 2 in Fig. 1.
Figure 3:
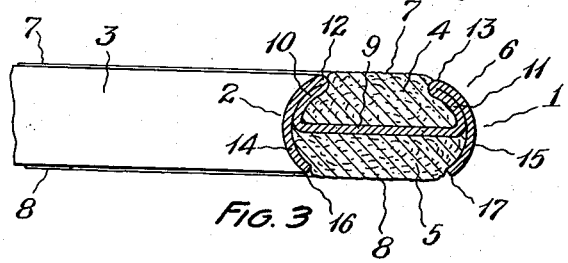
Fig. 3 is an enlarged transverse sectional view thru one side of this gasket, similar to a portion of Fig. 2 and showing the detail construction of the gasket.

In the completed gasket, as illustrated in Figures 1 to 3, these flanges 10 and 11 are preferably progressively deflected toward the packing element and are curved concavely toward the packing element and web, as will be evident from an inspection of Fig. 3, whereby the area of the opening between the terminals 12 and 13 of the flanges 10 and 11 is substantially less than the area of the web 9.

The outermost terminals or edges 12 and 13 of the flanges 10 and 11, as will appear, are disposed outwardly from the plane of the web a distance substantially equal to, but preferably less than the thickness of the packing element 4.

At the terminal 12 the sheet metal of the flange 10 is reversely bent 180° and folded upon itself to form the flange 14 extending in a direction generally opposite to the direction of the flange 10, this flange 14 projecting a substantial distance beyond the plane of the web and terminating at 16. At the terminal 13, the sheet metal of the flange 11 is likewise reversely bent 180° and folded upon itself to form a flange 15 extending in a direction generally opposite to the direction of the flange 11, this flange 15 also projecting beyond the plane of the web 9 and terminating at 17. For purposes of identification and differentiation, the flanges 10 and 11 may be termed concealed flanges and the flanges 14 and 15 may be termed exposed flanges.

It will be apparent from the drawings that the flanges 14 and 15 are in engagement with the outer surfaces of the flanges 10 and 11 until the flanges 14 and 15 pass beyond the plane of the web whereupon the flanges 14 and 15 engage the peripheries of the packing element 5. It will also be evident that the flanges 14 and 15 are curved concavely toward the web and packing elements, the curvature of the inner surfaces of the flanges 14 and 15 being identical with the curvature of the outer surfaces of the flanges 10 and 11 for their entire engaging area, that is until the flanges 14 and 15 pass beyond the plane of the web from which point the flanges 14 and 15 are progressively deflected inwardly toward the packing element 5 and are curved concavely toward the packing element whereby the area of the opening between the terminals 16 and 17 of these exposed flanges is substantially less than the area of the web.

The terminal edges 16 and 17 of the flanges extend outwardly from the plane of the web a distance substantially equal to but preferably less than the thickness of the packing element 5.

It will be evident from an inspection of the drawings that both flanges 10 and 14 and flanges 11 and 15 are integral continuations of the marginal edge portions of the sheet metal web 9. It will be noted that, in the embodiment shown, the width of the exposed flanges 14 and 15 is substantially twice the width of the concealed flanges 10 and 11, and that the web is disposed substantially in the median plane of the casing. It will also be clear that one portion of these integrally formed flanges, the upwardly extending portion as viewed in the drawings, is formed of a double wall of sheet metal and that the other flange portion, the lower portion as viewed in the drawings, consists of a single wall of metal. It is also evident that the web 9 is interposed between the two layers of packing material, and that the web thus serves to space the two packing elements apart. It is further clear that the flanges extending bi-laterally from the web form, with the web, a pair of oppositely outwardly opening recesses or cavities for receiving the packing elements and that the edges of these packing elements are firmly confined or clenched in the casing by the concave configurations of the flanges.

When the above described gasket is installed between two flanges or joint surfaces to be sealed, the drawing up of the flanges will first cause the joint surfaces to engage the faces 7 and 8 of the packing elements 4 and 5. This advance engagement of the joint surfaces with the packing permits the relatively compressible and somewhat resilient packing elements to conform to and become seated against the irregular joint surfaces, thus causing the projecting portions of the asbestos to be very substantially compressed before the joint surfaces contact the terminals 12, 13, 16 and 17 of the flanges of the sheet metal casing. Further drawing up of the joint surfaces will cause the surfaces to successively engage and deflect the terminals 12, 13, 16 and 17 toward the web 9 thus causing not only a further compression of the body of the packing material but also a downward and inward movement of the flanges 10, 11, 14 and 15 tending to still further densify the confined packing elements. This increase in the sealing effectiveness of the asbestos packing under the compression of the flanges is additional to the sealing effect obtained by the advantageous sealing engagement resulting from the contact of the relatively narrow terminal edges 12, 13, 16 and 17 with the joint surfaces.

It is evident that a tight joint may readily be effected with this type of gasket without the application of excessive pressures.

The resilience of the flanges supplemented by the resilience of the confined asbestos adapts this gasket exceptionally well for effecting a seal between distorted or otherwise misalined joint surfaces. This supplemented resilience of the flanges is also effective for maintaining the seal tight during expansion and contraction of the flanges and connections induced by varying conditions of temperature and pressure.

It will appear from an inspection of the drawings that the two packing elements in this gasket altho in intimate engagement with the surfaces of the opposed joint surfaces for a substantial area, are completely confined within the continuous peripheral flanges of the casing, and are thus reinforced against blowouts, abrasions, channelling, or other failures.

As will be understood, this gasket due largely to the I-beam configuration of the transverse section thru the casing of this gasket, is relatively very strong to resist distortion especially in a direction parallel to the web, either in handling, packing, shipping, assembling or in service. The inwardly curved peripheral flanges, as will be understood, contribute materially to the strength and resistance to the distortion, and the intermediate web member assures a construction of gasket which will change its thickness but will not perceptibly change its area as the pressure is applied.

Referring now to the novel method of producing this improved composite gasket. Figures 7, 8 and 9 illustrate, in plan view and transverse section, a stamping $6a$ in one of the initial stages of fabrication from which the improved casing or shell of such a gasket as is illustrated in Figures 1 to 3 may be produced, this stamping including a web $9a$, an outer peripheral right angularly depending flange $15a$ and an inner peripheral right angularly depending flange $14a$ defining an opening $3a$. This stamping is preferably formed from a flat sheet and may be produced by drawing or forming from an annular blank, or made from the sheet by a single punching operation with a combination blanking and forming die or by spinning, or by any other desired process, depending on the contour of the stamping and on the facilities available.

The partly completed blank $6a$ described above is then subjected to a further pressing or drawing operation to transform the stamping $6a$ to the shape illustrated at $6b$ in plan and sectional views, in Figures 10, 11 and 12. This casing comprises a web $9b$, flanges $10b$ and $11b$ extending upwardly substantially perpendicularly to the plane of the web at the inner and outer periphery respectively, of the web $9b$, and terminating at $12b$ and $13b$, and flanges $14b$ and $15b$ reversely bent at and extending downwardly substantially perpendicularly to the plane of the web from the terminals $12b$ and $13b$ of the flanges $10b$ and $11b$ and terminating below the web $9b$ at $16b$ and $17b$. This casing may be produced by firmly holding the partially fabricated stamping $6a$ in a die and causing a punch of suitable size to telescope downwardly into the stamping $6a$ until the web $9a$ has been positioned substantially as shown at $9b$ in Fig. 12. This operation may also be performed by any other desired method.

The improved form of casing $6b$, is now ready to receive the packing elements preliminary to the completion of the gaskets. One of the preformed packing elements $4b$ cut from suitable sheet packing or otherwise produced, is illustrated typically in Figures 13 and 14, in plan and section.

In Figure 15 is illustrated in section, a casing $6b$ in which have been assembled, in any desired manner, preformed packing elements $4b$ and $5b$, these parts being shown associated with certain dies which are utilized to complete the permanent assembling and contour forming of the gasket, these dies comprising upper and lower members $18$ and $19$ each formed with a suitably curved concave recess adapted, when actuated, to deflect and curve the flanges $10b$, $11b$, $14b$ and $15b$ concavely toward the packing and the web.

The completed composite gasket produced by the closing of the dies $18$ and $19$ is illustrated in Fig. 16, in which the parts of the gasket are designated by the same reference characters as were used in describing the corresponding structure in Figures 1 to 3.

It will be evident that this final assembling and forming operation can be equally well effected by spinning or other well known processes depending on the contour of the opening and peripheries of the gasket.

While the gauge of the sheet metal in the above described gaskets is necessarily, for the sake of clearness, shown thicker than the gauge used for many installations, thicknesses of the order of .008″ to .015″ being considered suitable for the gaskets shown, the thickness of the sheet metal is naturally dependent upon the conditions of the service for which the gasket is intended.

As will be understood, various modifications may be made in this composite gasket particularly in the conformation of the casing or shell.

Figure 4:
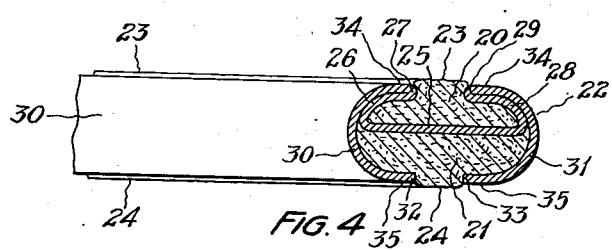
Fig. 4 is a view similar to Fig. 3 illustrating a modified form of this improved gasket embodying slightly different form of shell.

One such modification is illustrated in Fig. 4 in which portions only of the packing confining flanges are curved and in which the terminal portions of the flanges are formed with flat areas parallel to the web. In this modification the packing elements $20$ and $21$ are confined respectively in the upper and lower channels or cavities of the casing $22$, these elements being formed with faces $23$ and $24$ for engaging the surfaces to be sealed.

As in the previously described construction the casing is formed of a unitary piece of thin relatively stiff sheet metal by stamping or other convenient process. This casing $22$, in this disclosure, consists of a web $25$ generally parallel to the plane of the gasket and of substantially the same contour as the packing elements $20$ and $21$ which are seated against this web. At the inner periphery of the web $25$, the sheet metal is curved laterally from the plane of the web to form the flange $26$ engaging the inner periphery of the packing element $20$ and terminating at $27$, adjacent the outer face of this packing element. The flange $26$ includes a terminal portion which is flat and substantially parallel to the plane of the gasket. At the outer periphery of the web $25$ the sheet metal is likewise curved laterally from the plane of the web to form the flange $28$ engaging the outer periphery of the packing element $20$ and terminating at $29$. This flange $28$ is also formed with a flat terminal portion parallel to the plane of the gasket.

At the terminals $27$ and $29$ the sheet metal of the flanges $26$ and $28$ is reversely bent and folded upon itself to form the relatively longer exposed flanges $30$ and $31$, these exposed flanges contacting the outer surfaces of the flanges $26$ and $28$ until the exposed flanges pass beyond the plane of the web $25$ where the exposed flanges curve toward and engage the periphery of the packing element $24$ and terminate at $32$ and $33$ respectively, flat areas parallel to the web being formed adjacent the terminals.

The construction just described is substantially similar to that illustrated in Fig. 3, except that the casing of Fig. 4 is provided with upper alined flat surfaces $34$, $34$ and similarly lower alined flat areas $35$, $35$ parallel to the web, and that the exposed packing faces $23$ and $24$ are relatively smaller in area than the corresponding faces $7$ and $8$ in the previously described construction. These faces $23$ and $24$ project above or outwardly beyond the planes of the adjacent flat areas $34$, $34$ and $35$, $35$. This gasket is advantageously used where a larger area of sheet metal engagement with the joint surfaces is required and where at the same time the joint surfaces are grooved or machine turned so that a compressible conforming packing element is required to form a completely tight seal.

Figures 5, 6:
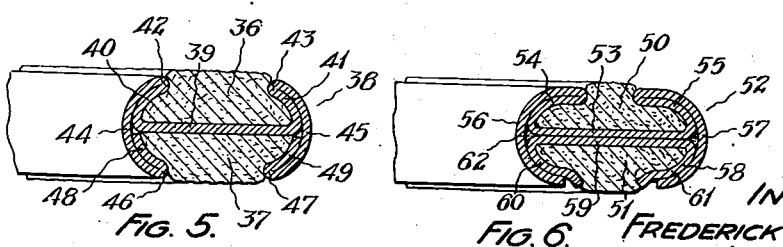
Fig. 5 is another view similar to Fig. 3 illustrating a further modified form of this improved gasket, in which both peripheral side walls of the casing or shell of the gasket are formed of a double thickness of metal.
Fig. 6 is a view similar to Fig. 3 showing still another modification of this invention in which an additional element has been added to produce the shell or casing of the gasket.

Fig. 5 illustrates another modified form of this invention which is generally similar to the disclosure of Fig. 3 except that the packing confining flanges are formed thruout their extent with a double thickness of the sheet metal. In this modified form, the packing elements 36 and 37 are mounted in the casing 38. This casing, as in the previously described constructions, is formed of a unitary piece of relatively stiff thin sheet metal and comprises a web 39, concealed flanges 40 and 41 terminating at 42 and 43 respectively, and exposed flanges 44 and 45 reversely bent to nest upon the flanges 40 and 41. The length of the sheet metal of these flanges 44 and 45 is longer than the length of metal required for the corresponding flanges 14 and 15 in the gasket disclosed in Fig. 3, this additional length of metal being reversely bent inwardly at the terminals 46 and 47 to form the flanges 48 and 49 as clearly illustrated in Fig. 5. These flanges 48 and 49 extend inwardly substantially to the web 39. The reverse bending of the flange portions 48 and 49 may be effected by a drawing or spinning operation either simultaneously with or subsequently to the formation of a stamping for this casing similar to that disclosed in Fig. 12. The form of gasket just described has great peripheral strength and resistance to corrosion and abrasion and is especially well adapted for unusually severe conditions.

The modification of the gasket illustrated in Fig. 6 is somewhat similar to the gasket disclosed in Fig. 4 except that the gasket illustrated in Fig. 6 is formed thruout of a double thickness of metal, this result being produced by the use of a supplementary casing rigidly interlocked in the main casing. In this modification the packing elements 50 and 51 are confined in the two part casing indicated generally at 52. The main casing is formed with a web 53 generally parallel to the plane of the gasket. At the inner and outer peripheries of the web respectively, the metal of the web is curved laterally to form flanges 54 and 55 and at the outer terminals of these flanges the metal is reversely bent upon itself to form exposed flanges 56 and 57. Firmly interlocked between the flanges 56 and 57 and the web 50 is a supplementary casing 58 which is formed with a web 59 and laterally curved flanges 60 and 61 continuous with the metal of the web 59.

In the production of this gasket, the supplementary casing 58 may be inserted into the main casing in the assembling operation together with the packing element 51 prior to the inward curling of the flanges, as will be understood. Prior to the assembling of the supplementary casing in the main casing heat resisting sealing material may be interposed between the webs 53 and 59, as indicated at 62.

In the above specifications and in the appended claims, where the sealing face of the packing element is stated to project above or outwardly beyond the peripheral flanges of the gasket casing, it is understood that this relationship refers to the uncompressed or free position of the gasket, it being clear that the plane of the outer terminal edges of the flanges and the face of the packing element will be substantially coincident, when the gasket is compressed between the surfaces to be sealed. It will also be evident that, in the broader aspects of this invention, the packing elements, even in the free position, need not necessarily project above or beyond the outer plane of the sheet metal of the casing. Likewise the thickness of both packing elements in any one casing need not be the same and the relative thicknesses of the packing elements may be varied to suit the requirements. Further, different types of packing material or differently treated packing materials may be used in opposite sides of the casing if required by the condition of the joint surfaces. Also the packing elements need not be preformed and the casing may be produced in the form illustrated in Fig. 3, for instance, by the tools disclosed, and the packing in loose or plastic form may be subsequently inserted in the recesses formed in the casing.

It is also evident that the web of the casing need not necessarily be imperforate for many types of installations, and lightening holes may be provided in the web to reduce the weight of the casing and to permit a bonding of the packing material on opposite faces, without impairing the strength of the casing. Altho the double thickness of the flanges of the casing, as shown in Figures 3 and 4, are both disposed on the same side of the web, these double flanges may be formed on opposite sides of the web without departing from the scope of the invention.

Altho for purposes of illustration, this invention has been described in its embodiment in an annular gasket, it will be evident that the gasket instead of being provided with a single opening as illustrated, may be formed with a plurality of openings such as would be suitable for sealing the head of an internal combustion engine for instance, a gasket of this type comprising a pair of apertured sheets of packing material superposed upon a relatively thin sheet metal plate formed with registering apertures and having the sheet metal at the edges of the apertures and preferably also at the outer periphery of the gasket initially bent laterally and then reversely bent upon itself and inclined toward the respective edges of the packing material to form retaining flanges for the packing elements in the manner illustrated in the drawings for the annular gasket.

Many other modifications of this invention and its application in addition to those shown and described, will naturally occur to those skilled in this art, and the present disclosures should therefor be considered as typical only and applicant desires not to be limited to the exact construction shown and described.

What I claim is:

1. A composite gasket formed with an opening, comprising two layers of compressible packing material and a sheet metal casing having a relatively flat web interposed between the layers of packing material and having the sheet metal of the web bent outwardly from the plane of the web to form a flange engaging the periphery of one of said layers, and having the sheet metal at the outer terminal of said flange reversely folded upon the exterior face of the outwardly bent flange to form a second flange extending in a direction generally opposite to the direction of the first mentioned flange, said second flange extending to and beyond the plane of the web and engaging the periphery of the second of said layers.

2. A composite gasket formed with an opening, comprising two relatively compressible packing elements and a sheet metal casing, the casing having a relatively flat web interposed between the packing elements, the sheet metal of the web being bent outwardly from the plane of the web at the periphery of one of the packing elements, the outwardly bent portion extending from the plane of the web for a distance substantially equal to the thickness of the said packing element, the sheet metal of the flange being, at its terminal, reversely folded upon itself, the reversely folded portion extending in a direction generally opposite to the direction of the said outwardly bent portion and continuing beyond the plane of the web for a distance substantially equal to the thickness of the second packing element.

3. A composite gasket formed with an opening, comprising packing elements of substantially similar contour adapted to form the sealing faces of the gasket, and a sheet metal casing encompassing the packing elements, said casing having a relatively flat web of substantially the same contour as said packing elements and interposed between the packing elements, the sheet metal being bent outwardly from the plane of the web to form a flange engaging the periphery of one of the packing elements, this flange extending substantially to, but short of the sealing face of this packing element, and the sheet metal at the outer terminal of the flange being reversely bent upon itself to form a second flange extending generally in a direction opposite to the direction of the first mentioned flange, said second flange extending substantially to, but short of the sealing face of the other of said packing elements, whereby the sealing faces of the uncompressed packing elements project above the planes of the terminals of the flanges.

4. A gasket having an opening comprising upper and lower layers of compressible packing material adapted to form the sealing faces of the gasket and a sheet metal web interposed between said layers, the marginal edge of the sheet metal of the web being bent laterally for a distance substantially equal to the thickness of the adjacent layer of packing material and being then reversely folded upon said laterally bent portion, said reversely folded portion extending in a direction opposite to the direction of the laterally bent portion past the web for a distance substantially equal to the thickness of said second layer of packing material, both of said bent and reversely folded portions being bent concavely toward said web.

5. A gasket having an opening and comprising two layers of compressible packing material, a sheet metal web interposed between said layers, and integral continuations of the marginal edge portions of the sheet metal web bent laterally to form flanges about said opening extending for a distance on each side of the web substantially equal to the thickness of said layers and engaging the peripheral edge walls of the layers and concavely curved toward said web, at least one of said laterally bent flanges comprising a double wall of the sheet metal.

6. A composite gasket adapted to seal a joint between two opposed joint surfaces, comprising a sheet metal casing having an inner and outer periphery and a packing element disposed on each joint surface engaging face of the gasket, the casing being formed from a single integral piece of sheet metal and comprising a substantially flat web generally parallel to the plane of the gasket and flanges formed on each periphery of the casing extending laterally on both sides of the plane of the web, each flange being formed of a double thickness of metal on at least one side of the web, both flanges being curved concavely toward the web, and the edges of the packing elements being confined in the casing by said concave flanges.

7. A composite gasket formed with an opening, comprising a sheet metal casing having a web disposed substantially in the median plane of the casing, and opposed peripheral flanges projecting outwardly bi-laterally from the edges of the web, each flange being formed with a portion concavely curved toward the web and a portion substantially parallel with the web, and a pair of relatively soft packing elements seated within the recesses formed by the web and flanges.

8. A composite gasket formed with an opening, comprising a casing of relatively thin sheet metal, including a substantially median web and peripheral flanges integrally formed with and projecting bi-laterally from the web, said peripheral flanges and said web forming a pair of oppositely outwardly opening recesses, the flanges each being formed of a double thickness of sheet metal, and a pair of packing elements of substantially similar contour seated one in each recess.

9. A composite gasket formed with an opening, comprising a casing of relatively thin sheet metal, including a substantially median web and peripheral flanges integrally formed with and projecting laterally from the web and forming between said peripheral flanges a pair of oppositely outwardly opening recesses, the web and each of the flanges being formed of a double thickness of sheet metal, and a pair of packing elements of substantially similar contour seated one in each of the recesses.

10. A casing for gaskets formed from a unitary piece of relatively stiff sheet metal formed with an opening, comprising a web, and flanges formed at the peripheries of the web substantially perpendicular to the plane of the web, the flanges each comprising a wall integral with and bent laterally from the web and a second wall reversely folded upon the said laterally bent wall, and extending in the opposite direction from said laterally bent wall beyond the plane of the web.

11. A casing for gaskets formed from relatively thin resilient sheet metal, comprising a web and inner and outer peripheral flanges integrally formed with the sheet metal of the web and extending bi-laterally from the plane of the web, the flanges each comprising a wall integral with and bent laterally from the web and a second wall folded upon the said laterally bent wall and extending in the opposite direction from the said laterally bent wall beyond the plane of the web, portions of the flanges being curved concavely toward the web.

12. A casing for a gasket made from a unitary piece of relatively thin sheet metal formed with an opening and provided with a substantially flat web, a continuous peripheral flange projecting outwardly from one face of the web and a second peripheral flange continuous with the first flange formed by folding the metal at the outer terminal of the first flange back upon said first flange, said second flange extending beyond the plane of said web on the side opposed to said first flange, the outer terminal portion of at least one of the flanges being bent substantially parallel to the plane of the web, said outer terminal portion being positioned on the same side of the flange as the web and extending a distance substantially in excess of the thickness of the sheet metal from a median plane passing thru the flange at its intersection with the web.

13. A casing for gaskets comprising a pair of members each formed of a unitary relatively thin resilient piece of sheet metal formed with an opening, one of the members comprising a web disposed substantially in the median plane of the casing and integral peripheral flanges bilaterally projecting from the web forming a recess on each face of the member, the other member comprising a web and integral peripheral flanges unilaterally projecting from the web, said other member being nested within one of the recesses of the first named member.

FREDERICK W. GOETZE.